(12) United States Patent
Yliaho

(10) Patent No.: US 11,360,608 B2
(45) Date of Patent: Jun. 14, 2022

(54) METHOD AND APPARATUS FOR FORCE SENSING

(75) Inventor: Marko T. Yliaho, Tampere (FI)

(73) Assignee: Nokia Technologies Oy, Espoo (FI)

( * ) Notice: Subject to any disclaimer, the term of this patent is extended or adjusted under 35 U.S.C. 154(b) by 746 days.

(21) Appl. No.: 13/431,263

(22) Filed: Mar. 27, 2012

(65) Prior Publication Data

US 2013/0257817 A1   Oct. 3, 2013

(51) Int. Cl.
*G06F 3/041* (2006.01)
*G06F 3/043* (2006.01)
*G06F 3/046* (2006.01)

(52) U.S. Cl.
CPC .............. *G06F 3/043* (2013.01); *G06F 3/046* (2013.01); *G06F 3/041* (2013.01)

(58) Field of Classification Search
CPC . G06F 3/0488; G06F 3/044; G06F 3/041–047
USPC ..................... 178/18.01–20.4; 345/173–178
See application file for complete search history.

(56) References Cited

U.S. PATENT DOCUMENTS

| | | | |
|---|---|---|---|
| 5,241,308 A | 8/1993 | Young | 341/34 |
| 8,898,566 B1 * | 11/2014 | Rachabathuni | 715/708 |
| 2005/0272447 A1 * | 12/2005 | Eckel | 455/456.6 |
| 2006/0267963 A1 | 11/2006 | Pryor | 345/173 |
| 2007/0084265 A1 * | 4/2007 | Haveri | G01N 27/74 73/25.02 |
| 2007/0291953 A1 * | 12/2007 | Ngia et al. | 381/71.6 |
| 2008/0202824 A1 | 8/2008 | Philipp et al. | |
| 2009/0267906 A1 | 10/2009 | Schroderus | 345/173 |
| 2010/0085169 A1 * | 4/2010 | Poupyrev et al. | 340/407.2 |
| 2010/0141408 A1 * | 6/2010 | Doy et al. | 340/407.2 |
| 2010/0156824 A1 * | 6/2010 | Paleczny | G06F 3/016 345/173 |
| 2010/0156841 A1 | 6/2010 | Wang et al. | 345/174 |
| 2010/0182135 A1 | 7/2010 | Moosavi | 340/407.2 |
| 2011/0007023 A1 * | 1/2011 | Abrahamsson | G02F 1/13338 345/174 |
| 2011/0248916 A1 * | 10/2011 | Griffin et al. | 345/157 |
| 2011/0291951 A1 | 12/2011 | Tong | 345/173 |
| 2011/0291981 A1 * | 12/2011 | Yang | 345/174 |
| 2012/0243719 A1 * | 9/2012 | Franklin | G06F 1/1652 381/333 |
| 2013/0250500 A1 | 9/2013 | Tossavainen et al. | 361/679.01 |

FOREIGN PATENT DOCUMENTS

| | | |
|---|---|---|
| CN | 101373413 A | 2/2009 |
| CN | 101675411 A | 3/2010 |
| CN | 101980117 A | 2/2011 |

(Continued)

OTHER PUBLICATIONS

"KP235 Analog Absolute Pressure Sensor", Infineon, Sense & Control, Data Sheet, Revision 1.0, Jun. 21, 2010, 25 pgs.

*Primary Examiner* — Hang Lin
(74) *Attorney, Agent, or Firm* — Harrington & Smith

(57) ABSTRACT

In accordance with an example embodiment of the present invention, an apparatus is disclosed. The apparatus includes a housing and a sensor system. The housing includes a display assembly and a cavity. The cavity is proximate the display assembly. The sensor system is at the cavity. The sensor system is configured to determine an amount of force exerted on the display assembly in response to a pressure change inside the cavity.

21 Claims, 6 Drawing Sheets

(56) References Cited

FOREIGN PATENT DOCUMENTS

| | | |
|---|---|---|
| EP | 1 840 714 A1 | 10/2007 |
| EP | 2141574 A2 | 1/2010 |
| EP | 2 202 619 A1 | 6/2010 |
| WO | WO-2004107146 A2 | 12/2004 |
| WO | WO-2007/091600 A1 | 8/2007 |
| WO | WO-2008/151863 A1 | 12/2008 |
| WO | WO-2010/080917 A1 | 7/2010 |
| WO | WO-2010/085575 A1 | 7/2010 |
| WO | WO-2012/025783 A1 | 3/2012 |

\* cited by examiner

METHOD AND APPARATUS FOR FORCE SENSING

TECHNICAL FIELD

The invention relates to touch force sensing and, more particularly, to touch force sensing using a sensor.

BACKGROUND

An electronic device generally comprises a variety of user interface components that enable users to interact with the electronic device. User interface components in portable electronic devices generally fulfill several requirements, such as compactness, suitability for mass manufacturing, durability, and ease of use. Increase of computing power of portable devices is turning them into versatile portable computers, which can be used for multiple different purposes. Therefore versatile user interface components are needed in order to take full advantage of capabilities of mobile devices.

Many mobile electronic device manufacturers provide touch screens for basic user interface (UI) control (for example for icon selection, screen scrolling, and so forth). As consumers demand increased functionality from electronic devices, there is a need to provide improved devices having increased touch screen capabilities.

SUMMARY

Various aspects of examples of the invention are set out in the claims.

According to a first aspect of the present invention, an apparatus is disclosed. The apparatus includes a housing and a sensor system. The housing includes a display assembly and a cavity. The cavity is proximate the display assembly. The sensor system is at the cavity. The sensor system is configured to determine an amount of force exerted on the display assembly in response to a pressure change inside the cavity.

According to a second aspect of the present invention, a method is disclosed. An air pressure at a cavity of a device is measured. The cavity is proximate a display assembly of the device. An amount of force exerted on the display assembly is determined based on a change in air pressure at the cavity.

According to a third aspect of the present invention, a computer program product is disclosed. The a computer program product including a computer-readable medium bearing computer program code embodied therein for use with a computer, the computer program code includes: code for measuring an air pressure at a cavity of a device. The cavity is proximate a display assembly of the device. Code for determining an amount of force exerted on the display assembly based on a change in air pressure at the cavity. Code for performing an operation based, at least partially, upon the determined force on the display assembly.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 10 of the drawings.

Figure 2:
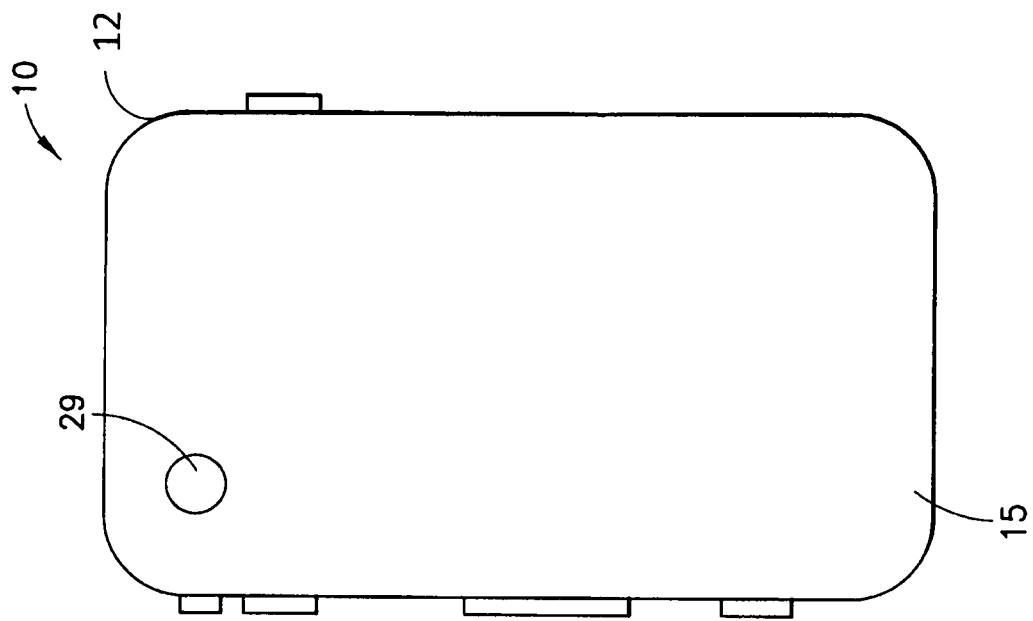
FIG. 2 is a rear view of the electronic device shown in FIG. 1.
Figure 1:
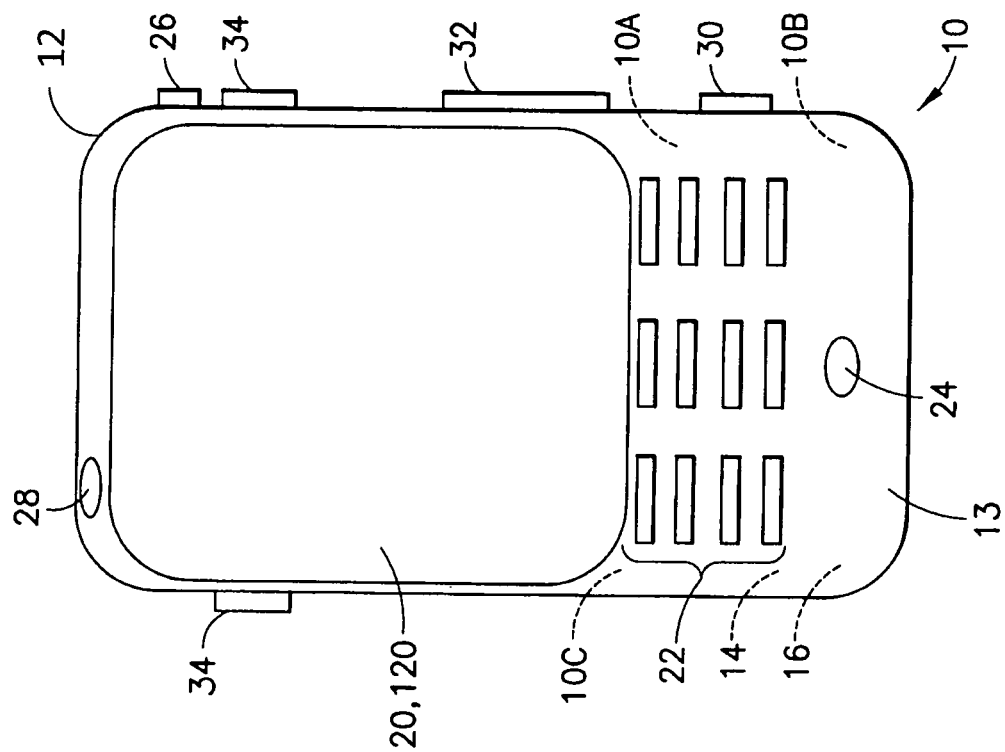
FIG. 1 is a front view of an electronic device incorporating features of the invention.

Referring to FIG. 1, there is shown a front view of an electronic device (or user equipment [UE]) 10 incorporating features of the invention. Although the invention will be described with reference to the exemplary embodiments shown in the drawings, it should be understood that the invention can be embodied in many alternate forms of embodiments. In addition, any suitable size, shape or type of elements or materials could be used.

According to one example of the invention, the device 10 is a multi-function portable electronic device. However, in alternate embodiments, features of the various embodiments of the invention could be used in any suitable type of electronic device such as a mobile phone, a gaming device having wireless communication capabilities, a music player having wireless communication capabilities, a portable computer having wireless communication capabilities, a personal digital assistant having wireless communication capabilities, Internet appliances permitting wireless Internet access and browsing, as well as portable units or terminals that incorporate combinations of such functions, for example. In addition, as is known in the art, the device 10 can include multiple features or applications such as a camera, a music player, a game player, or an Internet browser, for example. It should be noted that in alternate embodiments, the device 10 can have any suitable type of features as known in the art.

The device 10 generally comprises a housing 12, a graphical display interface 20, and a user interface 22 illustrated as a keypad but understood as also encompassing touch-screen technology at the graphical display interface 20 and voice-recognition technology (as well as general voice/sound reception, such as, during a telephone call, for example) received at the microphone 24. However, it should be noted that in alternate embodiments, more than one microphone may be provided. A power actuator 26 controls the device being turned on and off by the user. The exemplary UE 10 may have a forward facing camera 28 (for example for video calls) and/or a rearward facing camera 29 (for example for capturing images and video for local storage, see FIG. 2). The cameras 28, 29 are controlled by a shutter actuator 30 and optionally by a zoom actuator 32 which may alternatively function as a volume adjustment for the speaker(s) 34 when the cameras 28, 29 are not in an active mode. While various exemplary embodiments have been described above in connection with physical buttons or switches on the device 10 (such as the shutter actuator and the zoom actuator, for example), one skilled in the art will appreciate that embodiments of the invention are not necessarily so limited and that various embodiments may comprise a graphical user interface, or virtual button, on the touch screen instead of the physical buttons or switches.

While various exemplary embodiments of the invention have been described above in connection with the graphical display interface 20 and the user interface 22, one skilled in the art will appreciate that exemplary embodiments of the invention are not necessarily so limited and that some embodiments may comprise only the display interface 20 (without the user interface 22) wherein the display 20 forms a touch screen user input section.

The UE 10 includes electronic circuitry such as a controller, which may be, for example, a computer or a data processor (DP) 10A, a computer-readable memory medium embodied as a memory (MEM) 10B that stores a program of computer instructions (PROG) 10C, and a suitable radio frequency (RF) transmitter 14 and receiver 16 configured for bidirectional wireless communications with a base station, for example, via one or more antennas.

The PROGs 10C is assumed to include program instructions that, when executed by the associated DP 10A, enable the device to operate in accordance with the exemplary embodiments of this invention, as will be discussed below in greater detail.

That is, the exemplary embodiments of this invention may be implemented at least in part by computer software executable by the DP 10A of the UE 10, or by hardware, or by a combination of software and hardware (and firmware).

The computer readable MEM 10B may be of any type suitable to the local technical environment and may be implemented using any suitable data storage technology, such as semiconductor based memory devices, flash memory, magnetic memory devices and systems, optical memory devices and systems, fixed memory and removable memory. The DP 10A may be of any type suitable to the local technical environment, and may include one or more of general purpose computers, special purpose computers, microprocessors, digital signal processors (DSPs) and processors based on a multicore processor architecture, as non-limiting examples.

Figure 3:
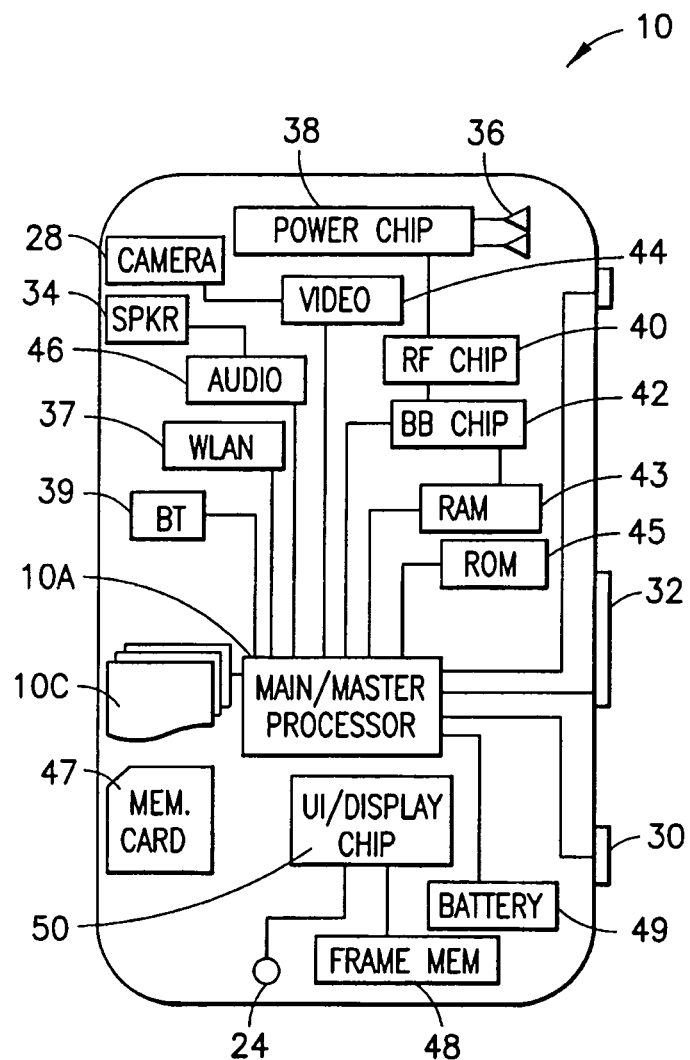
FIG. 3 is a block diagram of exemplary components of the electronic device shown in FIG. 1.

Referring now also to the sectional view of FIG. 3, there are seen multiple transmit/receive antennas 36 that are typically used for cellular communication. The antennas 36 may be multi-band for use with other radios in the UE. The operable ground plane for the antennas 36 is shown by shading as spanning the entire space enclosed by the UE housing though in some embodiments the ground plane may be limited to a smaller area, such as disposed on a printed wiring board on which the power chip 38 is formed. The power chip 38 controls power amplification on the channels being transmitted and/or across the antennas that transmit simultaneously where spatial diversity is used, and amplifies the received signals. The power chip 38 outputs the amplified received signal to the radio-frequency (RF) chip 40 which demodulates and downconverts the signal for baseband processing. The baseband (BB) chip 42 detects the signal which is then converted to a bit-stream and finally decoded. Similar processing occurs in reverse for signals generated in the apparatus 10 and transmitted from it.

Signals to and from the cameras 28, 29 pass through an image/video processor 44 which encodes and decodes the various image frames. A separate audio processor 46 may also be present controlling signals to and from the speakers 34 and the microphone(s) 24. The graphical display interface 20 is refreshed from a frame memory 48 as controlled by a user interface chip 50 which may process signals to and from the display interface 20 and/or additionally process user inputs from the keypad 22 and elsewhere.

Certain embodiments of the UE 10 may also include one or more secondary radios such as a wireless local area network radio WLAN 37 and a Bluetooth® radio 39, which may incorporate an antenna on-chip or be coupled to an off-chip antenna. Throughout the apparatus are various memories such as random access memory RAM 43, read only memory ROM 45, and in some embodiments removable memory such as the illustrated memory card 47. The various programs 10C are stored in one or more of these memories. All of these components within the UE 10 are normally powered by a portable power supply such as a battery 49.

The aforesaid processors 38, 40, 42, 44, 46, 50, if embodied as separate entities in the UE 10, may operate in a slave relationship to the main processor 10A, which may then be in a master relationship to them. Embodiments of this invention may be disposed across various chips and memories as shown or disposed within another processor that combines some of the functions described above for FIG. 3. Any or all of these various processors of FIG. 3 access one or more of the various memories, which may be on-chip with the processor or separate therefrom.

Note that the various chips (e.g., 38, 40, 42, etc.) that were described above may be combined into a fewer number than described and, in a most compact case, may all be embodied physically within a single chip.

The housing 12 may include a front housing section (or front cover section) 13 and a rear housing section (or rear/back cover section) 15. However, in alternate embodiments, the housing may comprise any suitable number of housing sections.

Figure 4:
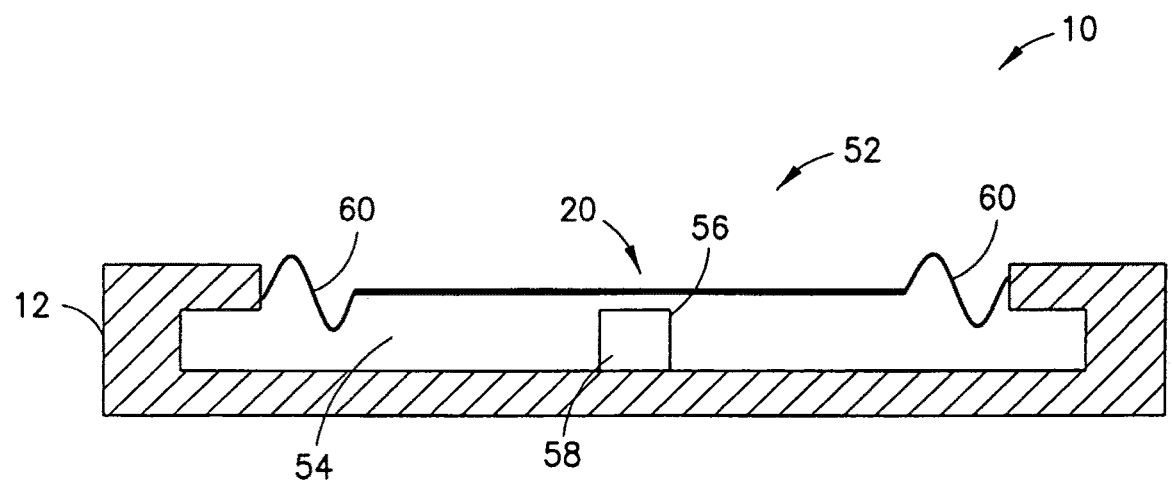
FIG. 4 is an exemplary section view of the electronic device shown in FIG. 1.

Referring now also to FIG. 4, there is shown a section view of the device 10. The device 10 further comprises a display assembly 52 connected to the housing 12, an interior device cavity 54, and a sensor system 56. According to various exemplary embodiments of the invention, the sensor system comprises an air pressure sensor 58 at the cavity 54, wherein the sensor 58 is connected to the printed circuit board. However, in alternate embodiments, any suitable type of sensor system configuration may be provided.

It should be noted that the air pressure sensor 58 may be any suitable sensor such as a KP235 Analog Absolute Pressure Sensor manufactured by Infineon Technologies AG (Germany), for example. The KP235 Analog Absolute Pressure Sensor offers an accuracy of about +/−1.2 kPa for the air pressure.

The display assembly 52 comprises the display 20 and a display suspension 60 connected between the display assembly 52 and the housing 12. According to various exemplary embodiments of the invention, the display 20 includes a front window. However, in alternate embodiments a front window may not be provided. The display suspension 60 may comprise any suitable flexible member (such has a flexible membrane, for example) configured to movably support the display assembly relative to the device housing. According to some embodiments of the invention, the display suspension may comprise a flexible membrane or plate suspension membrane constructed out of polyethylene terephthalate (PET) polyester film, for example. Additionally, the flexible membrane 60 may be attached the display 20 and to the housing 12 in any suitable fashion.

According to various exemplary embodiments of the invention, the display 20 may comprise any suitable touch screen and/or display configurations as is known in the art. For example, the display 20 may comprise one or more layers configured to provide the touch screen interface and may comprise a capacitive sensor configured to be sensitive to the presence of a finger above or on the touch screen interface. In some other embodiments of the invention the display may be configured to provide the touch screen interface with a resistive sensor comprising of several layers of which two are thin, metallic, electrically conductive layers separated by a narrow gap. However, it should be understood that any suitable touch screen technology and/or configuration may be provided. Furthermore, according to some embodiments of the invention, a display element layer can be located below the touch input layers and project an image through the touch input layers to be viewed by the user. The display element layer of the display 20 may comprise any suitable display technology such as liquid crystal display (LCD), light emitting diodes (LED), organic light emitting diodes (OLED), plasma display cells, Field emission display (FED), surface-conduction electron-emitter displays (SED), and Electophoretic displays (also known as electronic paper, e-paper or electronic ink displays). However, any suitable touch screen and/or display configurations may be provided.

Figure 5:
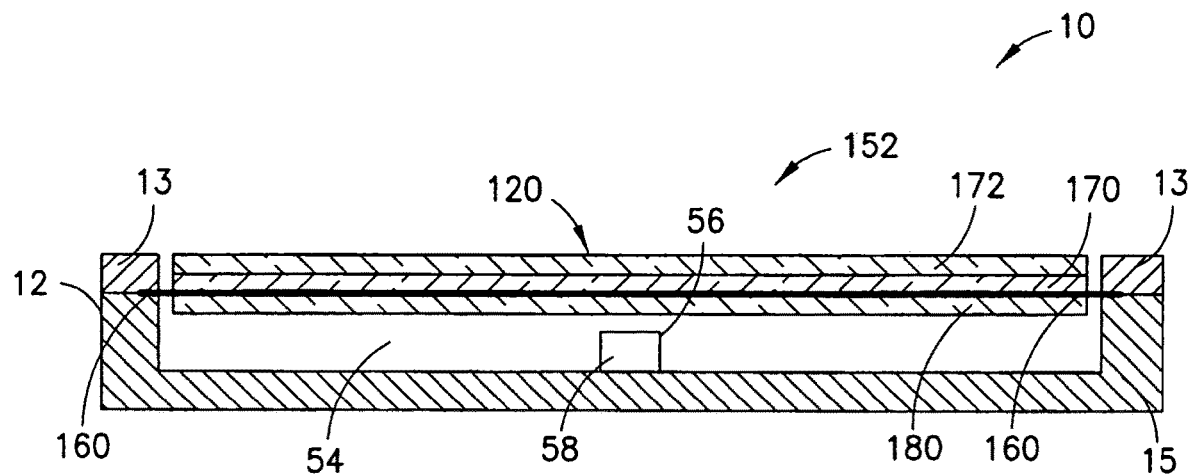
FIG. 5 is another exemplary section view of the electronic device shown in FIG. 1.
Figure 6:
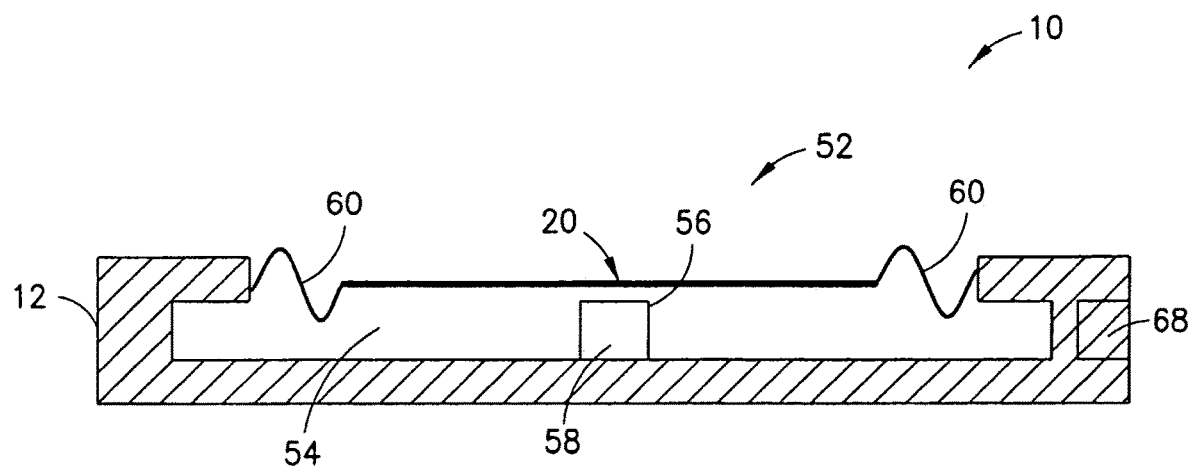
FIG. 6 is another exemplary section view of the electronic device shown in FIG. 1 with an additional sensor.
Figure 7:
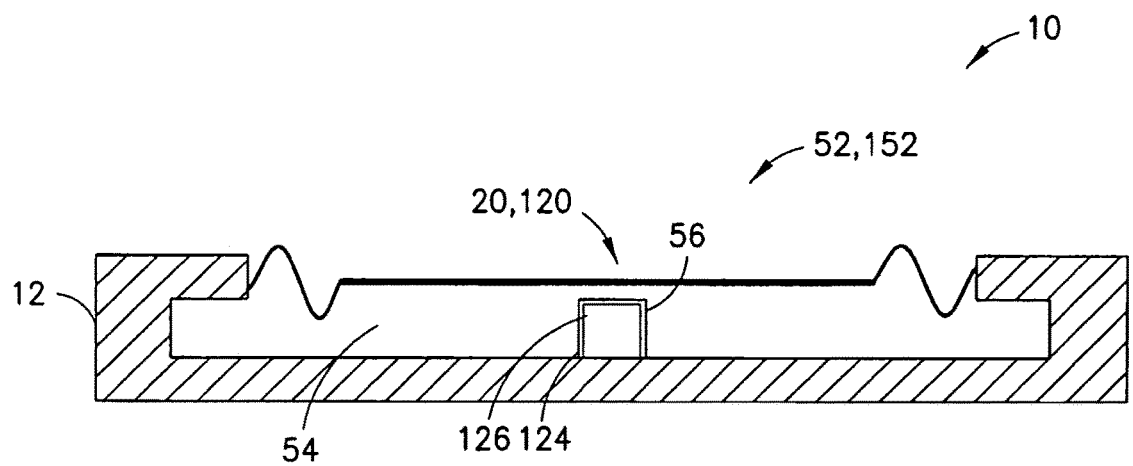
FIG. 7 is another exemplary section view of the electronic device shown in FIG. 1 with one or more microphones.
Figure 8:
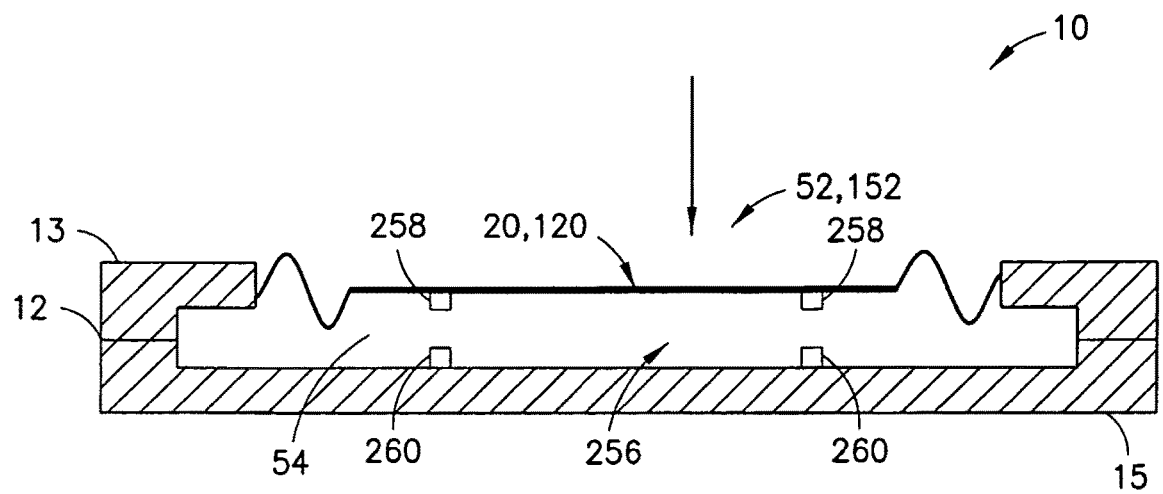
FIG. 8 is another exemplary section view of the electronic device shown in FIG. 1 with a magnetic field sensing system.
Figure 9:
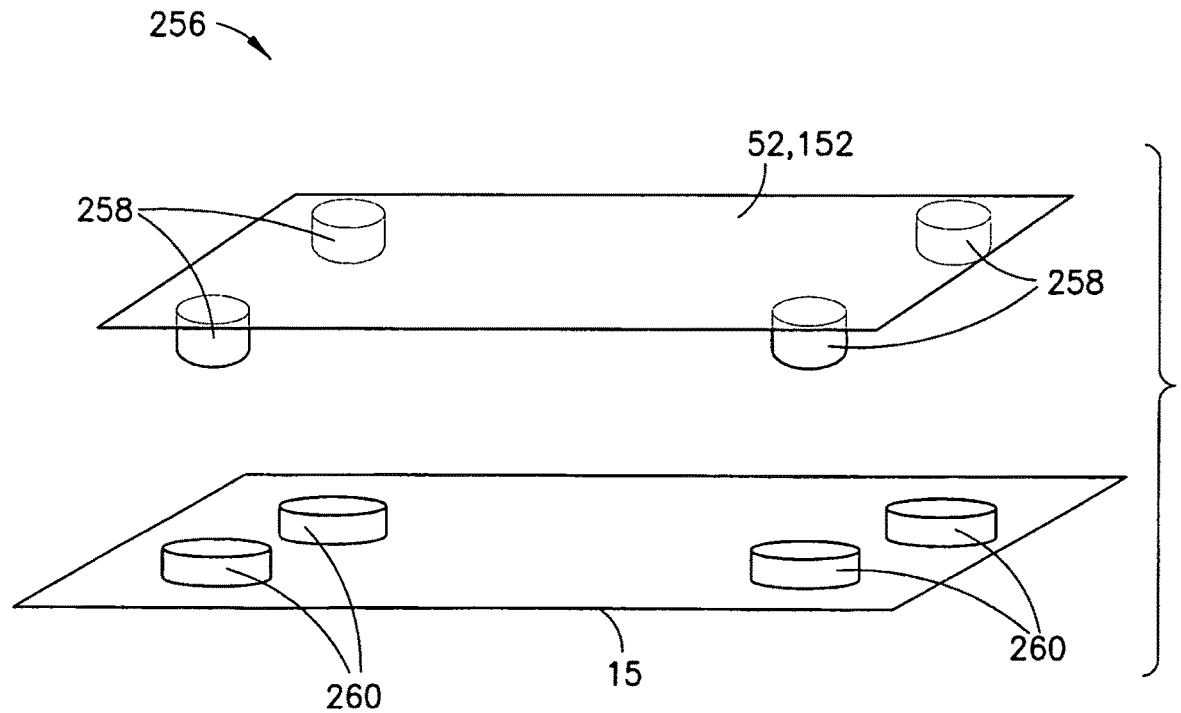
FIG. 9 is an enlarged view of the magnetic field sensing system shown in FIG. 8.

Referring now also to FIG. 5 another exemplary embodiment of the invention is shown. In this embodiment, the display assembly 152, display 120, and display suspension 160, are substantially the same as the display assembly 52, display 20, and display suspension 60 shown in FIG. 4. However, in the exemplary embodiment shown in FIG. 5, the display assembly 152 may further be utilized to provide functionalities for audio, display and vibrations (comprising haptic feedback) in a Tactile Audio Display.

Still referring to FIG. 5, there is shown the display assembly 152 comprising the display 120 and the display suspension 160. Additionally, a piezoelectric actuator 180 is provided adjacent the display assembly, at the display suspension 160.

According to various exemplary embodiments of the invention, the display 120 comprises a panel section 170 and a front window (or window plate) 172. Similar to the display 20, the panel section 170 may comprise any suitable number of touch screen user interface layers and display element layers to provide touch screen and/or display panel configurations at the display 120.

The display suspension 160 may comprise a flexible membrane or plate suspension membrane constructed out of polyethylene terephthalate (PET) polyester film, for example. According to some embodiments of the invention, the flexible membrane 160 is sandwiched at the periphery of the membrane between the housing section 13 and the housing section 15. However, any suitable method for attaching the display suspension 160 to the housing 12 may be provided.

The piezoelectric actuator 180 is generally configured to produce a physical moment or force in response to a current passed through the piezoelectric actuator 180. According to some embodiments, the piezoelectric actuator 180 may be configured to flex and produce a motion relative the display 120. In other words where the display is considered to be in a plane designated the X-Y axis the actuations of the piezoelectric actuator to actuate or produce a force in a "Z" dimension or direction. Although various examples of the invention are described with respect to the use of a piezoelectric actuator, it would be understood that any suitable actuator capable of producing a translational force to a display could be implemented in some further embodiments. In some further embodiments the display can directly experience the force which is transmitted from the piezoelectric actuator to the display assembly 152 in such a manner to permit a planar motion of the display assembly.

The 'Audio Display' capability of the display assembly 152 is provided with use of the flexible membrane connecting the display to the cover or main body of the device and capable of transferring the force provided by the actuator to the user by flexing and producing tactile or haptic feedback and audio speaker functionality. Additionally, the flexible membrane and/or the display assembly are configured to generate audio waves in response to the force. This configuration generally provides for generating touch screen devices capable of creating a more interactive user experience and audio generation through the screen.

According to some embodiments of the invention, the piezoelectric actuator 180 is coupled to the display assembly 152 via the display suspension 160. The piezoelectric actuator 180 is configured to vibrate in such a way that the bending moment of the piezoelectric actuator 180 transfers a force via the display suspension 160 to the display assembly 152 causing the display to move in a direction substantially normal to the front face of the device (or the 'Z' direction as compared to the x and y directions which define the display plane, or into and out of the apparatus 10) and perpendicular to the membrane layer.

The flexible membrane 160 is configured to, in some embodiments, enable displacement of the display assembly such that the display assembly can be tuned to provide a beneficial audio response. The display assembly 152 thus can produce a sufficient air displacement to generate audio signals with sufficient amplitude to implement not only earpiece operations but also to provide speaker operations such as, for example, integrated hands free speaker (or speakerphone/loudspeaker) operations.

However, it should be understood that while various exemplary embodiments of the invention have been described in connection with the display assembly having 'Audio Display' capabilities, one skilled in the art will appreciate that embodiments of the invention are not necessarily so limited to 'Audio Display' configurations, and embodiments of the invention may comprise any suitable type of display where the display assembly, or display stack, is movable (such as a 'loose' display that can be pushed 'down' [or in] by a user substantially comparable to one that is used in a Tactile Audio Display).

Various exemplary embodiments of the invention provide for touch event force sensing using an air pressure sensor measuring the air pressure inside the device. In some embodiments of the invention, the back cavity 54 of the device is sealed, and the air pressure sensor in suitably disposed in the back cavity 54. When the display stack 52, 152 is pushed in a general 'down' direction (such as a direction substantially normal to the plane of the display screen), the pressure in the back cavity 54 increases and the pressure is measured using the sensor system 56. The information that the sensor 58 provides can be easily passed to the main processor of the device, as the sensor system 56 (and the sensor 58) are connected to the printed wiring board of the device. In embodiments of the invention where the back cavity 54 is fully sealed, the sensor 54 can measure the absolute pressure and thus absolute force that is used to press the display stack 52, 152 'down'.

For example, if it is assumed that the pressure inside the device 10 is the normal air pressure (100 kPa) and the volume of the air within the device decreases from about 74.25 mm$^3$ (1.5 mm*5.5 mm*9 mm) to about 69.3 mm$^3$ (1.4 mm*5.5 mm*9 mm) [these are approximate dimensions of the audio display back cavity from a device having around 4.3 inch display without borders and the display can move down at most 0.1 mm, which are provided as a non-limiting example], then reducing the volume by approximately 7% would result in approximately 7% increase in the air pressure inside the device 10. As mentioned above, the sensor 58 may comprise a measuring accuracy of about +/−1.2 kPa for the air pressure, and with this accuracy at least two or three different pressure steps (or pressure thresholds/values) can be measured. It should be noted that with sensors having increased accuracy, then even more steps could be measured. Additionally, the approximate area of the sensor component 58 may be about 49 mm$^2$ (7 mm*7 mm) which provides for suitability for an embedded device like mobile phone.

In embodiments of the invention where the back cavity 54 is not fully sealed, the sensor system 58 can also detect a change in the air pressure of the cavity. This may provide information about the force used during the touch event. Due to leakege at the cavity, the pressure will normalized after a certain time. However, the initial pressure change (and thus force) during the touch event still provides information that can be used to improve touch user experience.

In some embodiments of the invention it may also be that the reference air pressure inside the device needs to be measured constantly (for example, once a second) to ensure that the force sensing works in all air pressure conditions. For example, in an airplane the air pressure is equivalent to height of around 2 kilometers which is around 94 kPa. Generally, no matter how tight the sealing in the cavity is, in practice the surrounding air pressure might end up inside the device over time. Therefore in some embodiments of the invention, the measured air pressure may not be comparable to a fixed 100 kPa, but instead should be comparable to what the pressure is without pressing the display, wherein in this example embodiment, constant polling (or air sensing) may be provided. Alternatively, if the device has another air pressure sensor 68 (see FIG. 6) to measure the air pressure outside the device 10, then the outside air pressure can be used as a reference.

As pressing the display using the same force from the corner results in different air pressure inside the device than pressing the display from the middle, the touch point must be taken into account when calculating the force. This, for example, may be a product specific calculation with parameters such as, the stiffness of the window, the used audio display suspension, and the device dimensions, for example.

It may be that the absolute force measured cannot be used as such due to the measurement accuracy, but the used effective force should be, for example, the average force from the past 100 ms. If an average is used, the application could be given an option to decide the measurement period as some applications may need the instant force immediately while some applications would prefer more reliability even at the cost of some delay.

Some exemplary embodiments of the invention may comprise one or more microphones in the cavity 54. For example, referring now to FIG. 7, the sensor system 56 may comprise one or more microphones 124. Using the one or more microphones 124 and audio signal analysis would allow for detecting changes in the air pressure, or movement of the air, inside the sealed cavity. For example when using the microphone(s) inside the cavity, the characteristics of the 'wind' or 'air movement' inside the device could be measured. Also, according to some embodiments of the invention, for example, when using more than one microphone, it would possible to detect which portion/part of the display has been touched by the user, providing improved accuracy for the air pressure change evaluation and providing improved accuracy for touch input.

According to some other embodiments of the invention, the one or more microphones 124 may further comprise a membrane 126. The membrane 126 is configured to bend in response to the air pressure, or air pressure change, inside the cavity 54. For example, the sensor system may further include a sensor configured to measure the amount of 'bend'/'bending' at the membrane 126, wherein the then 'bend'/'bending' corresponds to the change in air pressure in the cavity. With the measurement of the 'bend'/'bending', and its correlation to the change in air pressure, the touch force at the display can be measured.

Some other exemplary embodiments of the invention may comprise a Magnetic field sensing system 256 at cavity 54. For example, referring now to FIGS. 8 and 9, the Magnetic Field sensing system 256 is configured to sense the force on the display by attaching a magnet or multiple magnets 258 to the display stack 52, 152. Then the chassis, or housing, of the device (for example on the rear/back cover section 15) may have one or more magnetic field sensors 260 to detect the z-axis movement of the display eventually resulting in measuring the force applied by the user. For example, in some embodiments, a single magnet configuration may not provide sufficient accuracy, as the display can be pressed at different areas/locations of the display and the same force would result in different measurement results depending of the touch point. Additionally, it should be noted that, in some embodiments, the amount of magnet field sensors can be lower than the amount of magnets (such as, four magnets and three sensors, for example) and still providing accuracy in measurements. However, in alternate embodiments, any suitable magnet/sensor configuration may be provided.

Various exemplary embodiments of the invention may use the force sensing capability is a variety of ways and/or multiple use cases. For example, some non-limiting use cases for the force sensing on the display may be provided as explained below.

For a camera application: when the device comprises a virtual camera button (such as, no HW key, for example) a 'light' press (resulting in low force) of the virtual button on the display can activate the auto-focus, and a 'strong' press (resulting in a higher force) then captures the image. This functionality would be analogous to the HW key functionality, for example.

For a 'car' or 'racing' game application: a 'light' press on the display, for example on the right side of the car's steering wheel makes the steering wheel turn a little to the right. A 'medium' strength press on the display makes the steering wheel turn a bit more to the right. A 'strong' press on the display makes the steering wheel turn the maximum amount to the right. In this kind of use case, the effect could be 'stepless' even if only a few force steps could be reliably measured, because the feedback is immediate and the user can adjust the strength.

For a 'Drawing' application: the stronger the press on the display is, the darker/lighter the drawing color/shade would be (for example, if blue [or other color] has been selected from the palette).

For a 'Music player' application: a 'light' press over a "fast forward" button on the display could make the fast forward operate at a normal speed (or first speed), and a 'strong' press over the "fast forward" button on the display could make the fast forward operate at a higher speed (such as triple the normal speed, for example).

For a 'Picture viewer' application: the strength of the press on the display could be equivalent to a pinch zoom, for example the stronger the press over an image, the closer it zooms.

For a 'Drum' application: the stronger the press on the display, the harder (and thus louder) a drum is hit in the application.

For an 'icon': a 'light' press over an icon displayed on the display could open a help tip (which may, for example, describe the functionality of the icon) and a 'stronger' press over the icon displayed on the display could activate the actual functionality.

For 'Scrolling' operations: the stronger the press when starting the "scroll swipe", the faster the scrolling (would be practical, for example, in a browser when browsing a long web page).

For a 'Hyperlink': a 'light' press on the display could open the new page in a new tab, and a 'stronger' press on the display could open the page in a new browser instance.

For a 'Back' button operation: a 'light' press over a back button displayed on the display screen could result in going to a previous page, or web site, and a 'stronger' press on the display could result in going to the beginning of the document or browsing history.

For 'Typing': a 'light' press over a key in a virtual keyboard could result in typing a lower-case letter, and a 'strong' press over a key in a virtual keyboard could result in typing an upper-case letter. A long-lasting 'light' press over a key in a virtual keyboard could result in the user interface displaying a number of alternative selections showing an extended set of letters (or related characters, symbols, for example) that can be typed using that key, and a long-lasting 'strong' press over a key in a virtual keyboard could result in the user interface displaying a number of alternative selections showing a different extended set of letters (or related characters, symbols, for example) that can be typed using that key, for example upper-case versions of the set that a long-lasting 'light' press provides. In some exemplary embodiments of the invention the different extended set of letters (or symbols) that can be typed using a key on the virtual keyboard may be, for example for the letter 'A', a letter 'A' with a diaeresis (Ä), a letter 'A' with a tilde (Ã), or a letter 'A' with a ring above (Å). However, it should be noted that these are merely provided as non-limiting examples and any suitable character, letter, or symbol may be provided with the long-lasting 'light'/'strong' press over the key described above.

In addition to the force sensing capability use cases described above, other 'new' functionalities may me provided. For example, a 'strong' long duration press in the home screen could open a pre-defined application, for example some status application showing the connectivity and battery status, or profiles selection application.

Technical effects of any one or more of the exemplary embodiments provide an 'Audio Display' technology wherein a sensor positioned behind the display monitors and measures air pressure when the display is subjected to force. This integration introduces new opportunities for improvements to mechanisms for detecting forces on a display module when compared to conventional configurations.

Without in any way limiting the scope, interpretation, or application of the claims appearing below, a technical effect of one or more of the example embodiments disclosed herein is an 'Audio Display' type module integration that is suitable for portable devices wherein air pressure behind display associated with Audio Display usage is measured wherein such measured data co-operates with associated use cases. Another technical effect of one or more of the example embodiments disclosed herein is providing an internal sensor in conjunction with 'Audio Display'. Another technical effect of one or more of the example embodiments disclosed herein is providing performance improvements for 'Audio Display' related use cases. Another technical effect of one or more of the example embodiments disclosed herein is providing a new dimension in the user functionality for touch user interfaces. Another technical effect of one or more of the example embodiments disclosed herein is overcoming the limitation of touch user interface functionality operating in only two dimensions, wherein 'touch events' on the display would get a new 'dimension' when the force applied to a 'touch event' on the display would be reliably measurable. Another technical effect of one or more of the example embodiments disclosed herein is providing an air pressure sensor in a sealed audio display "speaker back cavity" which measures the air pressure, and thus the force applied on the display, that has been used to press the display stack down.

Figure 10:
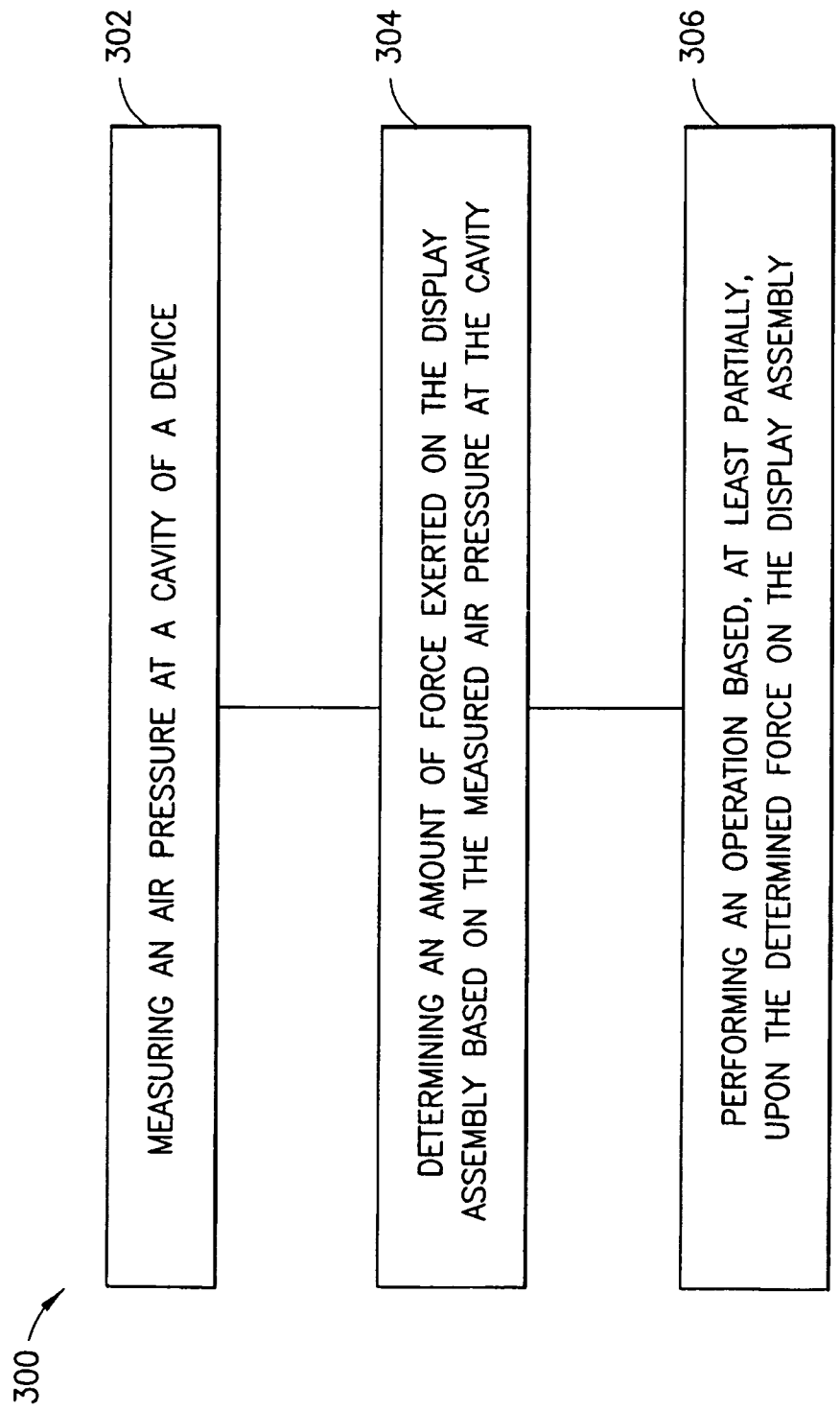
FIG. 10 is a block diagram of an exemplary method of the device shown in FIG. 1.

FIG. 10 illustrates a method 300. The method 300 includes measuring an air pressure at a cavity of a device, wherein the cavity is between a display assembly of the device and a housing section of the device (at block 302). Determining an amount of force exerted on the display assembly based on the measured air pressure at the cavity (at block 304). Performing an operation based, at least partially, upon the determined force on the display assembly (at block 306). It should be noted that the illustration of a particular order of the blocks does not necessarily imply that there is a required or preferred order for the blocks and the order and arrangement of the blocks may be varied. Furthermore it may be possible for some blocks to be omitted.

Referring to FIG. 3, the device 10 generally comprises the controller 10A such as a microprocessor for example. The electronic circuitry includes a memory 45 coupled to the controller 10A, such as on a printed circuit board for example. The memory could include multiple memories including removable memory modules for example. The device has applications 10C, such as software, which the user can use. The applications can include, for example, a telephone application, an Internet browsing application, a game playing application, a digital camera application, a map/gps application, etc. These are only some examples and should not be considered as limiting. One or more user inputs 20, 120 are coupled to the controller 10A. The Sensor system 56 and the sensor 58 are also coupled to the controller 10A (and/or the chip 50). The device 10 may programmed to automatically sense a force at the display. However, in an alternate embodiment, this might not be automatic. The user might need to actively select the force sensing capability.

It should be understood that components of the invention can be operationally coupled or connected and that any number or combination of intervening elements can exist (including no intervening elements). The connections can be direct or indirect and additionally there can merely be a functional relationship between components.

As used in this application, the term 'circuitry' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/ software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Embodiments of the present invention may be implemented in software, hardware, application logic or a combination of software, hardware and application logic. The software, application logic and/or hardware may reside on the device itself or on a removable device. If desired, part of the software, application logic and/or hardware may reside on the device, and part of the software, application logic and/or hardware may reside on the removable device. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 3. A computer-readable medium may comprise a computer-readable storage medium that may be any media or means that can contain or store the instructions for use by or in connection with an instruction execution system, apparatus, or device, such as a computer.

Below are provided further descriptions of various non-limiting, exemplary embodiments. The below-described exemplary embodiments may be practiced in conjunction with one or more other aspects or exemplary embodiments. That is, the exemplary embodiments of the invention, such as those described immediately below, may be implemented, practiced or utilized in any combination (for example, any combination that is suitable, practicable and/or feasible) and are not limited only to those combinations described herein and/or included in the appended claims.

In one exemplary embodiment, an apparatus comprising: a housing comprising a display assembly and a cavity, wherein the cavity is proximate the display assembly; and a sensor system at the cavity, wherein the sensor system is configured to determine an amount of force exerted on the display assembly in response to a pressure change inside the cavity.

An apparatus as above wherein the sensor system is an air pressure sensor system.

An apparatus as above wherein the sensor system comprises at least one microphone.

An apparatus as above wherein the display assembly is an audio display assembly comprising audio, display, and tactile feedback functionality.

An apparatus as above wherein the apparatus further comprises one or more piezoelectric actuators.

An apparatus as above wherein the display assembly comprises a touch screen user interface, and wherein the sensor system is configured to determine an amount of force exerted on the display assembly in response to a positional change of the display when force is exerted on the touch screen user interface.

An apparatus as above wherein the cavity is between the display assembly and a back cover section of the apparatus.

An apparatus as above wherein cavity is opposite a center portion of the display assembly.

An apparatus as above wherein the force corresponds to a touch at a touch screen of the display assembly.

An apparatus as above wherein the apparatus comprises a display suspension system connected between the housing and the display assembly.

An apparatus as above wherein the cavity is substantially sealed.

An apparatus as above wherein further comprising: at least one processor; and at least one memory including computer program code, the at least one memory and the computer program code configured to, with the at least one processor, cause the apparatus to perform at least the following: sense a change in the air pressure at the cavity; and determine an amount of force exerted on a touch screen of the display assembly.

An apparatus as above wherein the apparatus is a mobile phone.

In another exemplary embodiment, an apparatus comprising: a housing comprising a display assembly and a cavity, wherein the cavity is between the display assembly and a portion of the housing; and a sensor system at the cavity, wherein the sensor system is configured to determine an amount of force exerted on the display assembly in response to a pressure change inside the cavity.

An apparatus as above wherein the sensor system is configured to determine an amount of force exerted on the display assembly in response to a measured air pressure at the cavity.

An apparatus as above wherein the sensor system is configured to determine an amount of force exerted on the display assembly in response to a pressure change inside the cavity.

An apparatus as above wherein the sensor system is configured to determine an amount of force exerted on the display assembly in response to a positional change of the display when the force is exerted.

In another exemplary embodiment, a method comprising: measuring an air pressure at a cavity of a device, wherein the cavity is proximate a display assembly of the device; and determining an amount of force exerted on the display assembly based on a change in air pressure at the cavity.

A method as above wherein the display assembly is an audio display assembly comprising audio, display and tactile feedback functionality.

A method as above wherein the display assembly comprises a touch screen user interface.

A method as above wherein the cavity is between a display assembly of the device and a housing section of the device.

A method as above wherein the cavity is between the display assembly and a back cover section of the device.

A method as above further comprising performing an operation based, at least partially, upon the determined force on the display assembly.

A method as above wherein the performed operation is based on a value of the determined force.

In another exemplary embodiment, a computer program product comprising a non-transitory computer-readable medium bearing computer program code embodied therein for use with a computer, the computer program code comprising: code for measuring an air pressure at a cavity of a device, wherein the cavity is proximate a display assembly of the device; and code for determining an amount of force exerted on the display assembly based on a change in air pressure at the cavity; and code for performing an operation based, at least partially, upon the determined force on the display assembly.

A computer program product as above wherein the operation comprises code for measuring further comprises code for measuring the air pressure at a sealed cavity of the device, wherein the cavity is between an audio display assembly of the device and a housing section of the device.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense.

It should be understood that the foregoing description is only illustrative of the invention. Various alternatives and modifications can be devised by those skilled in the art without departing from the invention. Accordingly, the invention is intended to embrace all such alternatives, modifications and variances which fall within the scope of the appended claims.

What is claimed is:

1. An apparatus comprising:
   a housing;
   a display assembly;
   a display suspension system connected between the housing and the display assembly, wherein the display suspension system comprises a flexible membrane portion, and wherein the flexible membrane portion is configured to movably support the display assembly relative to the housing, wherein the housing comprises a cavity behind the display assembly;
   at least one actuator, wherein the at least one actuator is configured to cause the display assembly to move; and
   a sensor system at the cavity, wherein the sensor system is configured to determine a change in air pressure inside the cavity when an amount of force is exerted on the display assembly, wherein the apparatus is configured to perform an operation based, at least partially, upon the determined force on the display assembly;
   wherein the display assembly comprises a touch screen user interface, and wherein the sensor system is configured to determine the change in air pressure, when the amount of force is exerted on the touch screen user interface, in response to a positional change of the display assembly and a location of the exerted force;
   wherein the housing comprises a first housing section and a second housing section, wherein at least a portion of the display assembly is at the first housing section, wherein the second housing section substantially forms a rear cover section of the apparatus, wherein the flexible membrane portion extends between the first housing section and the display assembly, where a first section of the flexible membrane portion, which forms a periphery of the flexible membrane portion, is at the first housing section and a second section of the flexible membrane portion is at the display assembly, where the flexible membrane portion extends outward from a perimeter edge of the display assembly, wherein the flexible membrane portion is configured to movably support the display assembly from the perimeter edge of the display assembly relative to the first housing section when the display assembly moves, and wherein the flexible membrane portion is configured to allow displacement of the display assembly such that the display assembly is configured to provide audio speaker functionality when actuated.

2. An apparatus as in claim 1 wherein the sensor system is an air pressure sensor system.

3. An apparatus as in claim 1 wherein the sensor system comprises at least two microphones.

4. An apparatus as in claim 1 wherein the at least one actuator comprises one or more piezoelectric actuators.

5. An apparatus as in claim 1 wherein the cavity is between the display assembly and the rear cover section of the apparatus, and where the flexible membrane portion extends outward from opposite sides of the perimeter edge of the display assembly.

6. An apparatus as in claim 1 wherein the cavity is opposite a center portion of the display assembly, wherein the first housing section is a front cover section of the apparatus, wherein at least a portion of the display assembly is at the front cover section, wherein the periphery of the flexible membrane portion is sandwiched between the front cover section and the rear cover section such that a first side of the periphery of the flexible membrane portion is at the front cover section and an opposite second side of the periphery of the flexible membrane portion is at the rear cover section.

7. An apparatus as in claim 6 wherein the flexible membrane portion comprises a polymer material, and wherein the opposite second side of the periphery of the flexible membrane portion is in contact with the rear cover section.

8. An apparatus as in claim 6 wherein the rear cover section comprises a one-piece section and wherein the front cover section comprises a separate one-piece section.

9. An apparatus as in claim 1 wherein the cavity is substantially sealed, and wherein the sensor system is configured to determine the change in air pressure inside the substantially sealed cavity.

10. An apparatus as in claim 1 further comprising:
    at least one processor; and
    at least one memory including computer program code, where the at least one memory and the computer program code configured to, with the at least one processor, cause the apparatus to perform at least the following:
    sense a change in the air pressure at the cavity; and
    determine an amount of force exerted on the touch screen user interface of the display assembly.

11. An apparatus as in claim 1 wherein the apparatus is a mobile phone.

12. An apparatus as in claim 1 wherein the performed operation is based on a value of the determined force.

13. An apparatus as in claim 1 wherein the sensor system comprises a first sensing element and a second sensing element, wherein the first sensing element is configured to sense the air pressure inside the housing, and wherein the second sensing element is configured to sense air pressure outside the housing.

14. An apparatus as in claim 1 wherein the flexible membrane portion is configured to allow displacement of the display assembly such that the display assembly is configured to be tuned to provide an audio response, wherein the at least one actuator is coupled to the display assembly, and wherein the display assembly is configured to produce an air displacement which generates an audio signal.

15. An apparatus as in claim 1 wherein the display assembly comprises an audio display assembly comprising audio functionality, display functionality, and tactile feedback functionality, wherein the at least one actuator is coupled to the display assembly via the display suspension system, and wherein the flexible membrane portion and/or the display assembly are configured to generate audio waves.

16. An apparatus as in claim 1 wherein the first housing section and the second housing section are separate members of the apparatus.

17. An apparatus as in claim 1 wherein the display assembly comprises a front face and an opposite rear face, wherein the touch screen user interface is at the front face of the display assembly, wherein the rear face of the display assembly is opposite the rear cover section of the apparatus, and wherein the flexible membrane portion is configured to suspend the display assembly without any portion of the flexible membrane portion between the rear face of the display assembly and the rear cover section of the apparatus.

18. A method comprising:
measuring an air pressure at a cavity of a device, wherein the cavity is behind a display assembly of the device, wherein a display suspension system of the device is connected between a housing of the device and the display assembly, wherein the display suspension system comprises a flexible membrane portion, wherein the flexible membrane portion is configured to movably support the display assembly relative to the housing, and wherein at least one actuator of the device is configured to cause the display assembly to move;
determining, with a sensor system, a change in the air pressure inside the cavity when an amount of force is exerted on the display assembly; and
performing an operation based, at least partially, upon the determined force on the display assembly;
wherein the display assembly comprises a touch screen user interface, and wherein the determining of the amount of force further comprises determining the change in the air pressure, when the amount of force is exerted on the touch screen user interface, in response to a positional change of the display assembly and a location of the exerted force;
wherein the housing comprises a first housing section and a second housing section, wherein the second housing section substantially forms a rear cover section of the apparatus, wherein the flexible membrane portion extends between the first housing section and the display assembly, where a first section of the flexible membrane portion, which forms a periphery of the flexible membrane portion, is at the first housing section and a second section of the flexible membrane portion is at the display assembly, where the flexible membrane portion extends outward from a perimeter edge of the display assembly, wherein the flexible membrane portion is configured to movably support the display assembly from the perimeter edge of the display assembly relative to the first housing section when the display assembly moves, and wherein the flexible membrane portion is configured to allow displacement of the display assembly such that the display assembly is configured to provide audio speaker functionality when actuated.

19. A method as in claim 18 wherein the cavity is between the display assembly and the rear cover section of the device, and where the flexible membrane portion extends outward from opposite sides of the perimeter edge of the display assembly.

20. A computer program product comprising a non-transitory computer-readable medium bearing computer program code embodied therein for use with a computer, the computer program code comprising:
code for determining an air pressure at a cavity of a device, wherein the cavity is behind a display assembly of the device, wherein a display suspension system of the device is connected between a housing of the device and the display assembly, wherein the display suspension system comprises a flexible membrane portion, wherein the flexible membrane portion is configured to movably support the display assembly relative to the housing, wherein at least one actuator of the device is configured to cause the display assembly to move, wherein the housing comprises a first housing section and a second housing section, wherein the second housing section substantially forms a rear cover section of the apparatus, wherein the flexible membrane portion is positioned between the first housing section and the display assembly, where a first section of the flexible membrane portion, which forms a periphery of the flexible membrane portion, is at the first housing section and a second section of the flexible membrane portion is at the display assembly, where the flexible membrane portion extends outward from a perimeter edge of the display assembly, wherein the flexible membrane portion is configured to movably support the display assembly from the perimeter edge of the display assembly relative to the first housing section when the display assembly moves, and wherein the flexible membrane portion is configured to allow displacement of the display assembly such that the display assembly is configured to provide audio speaker functionality when actuated;
code for determining, with a sensor system, a change in the air pressure when an amount of force is exerted on the display assembly,
wherein the display assembly comprises a touch screen user interface, and wherein the determining of the amount of force further comprises determining the change in the air pressure, when the amount of force is exerted on the touch screen user interface, in response to a positional change of the display assembly and a location of the exerted force; and
code for performing an operation based, at least partially, upon the determined force on the display assembly.

21. A computer program product as in claim 20 wherein the operation comprises measuring the air pressure at the cavity of the device, where the cavity is a sealed cavity, wherein the cavity is between the display assembly of the device and at least one of the housing sections of the device, and where the flexible membrane portion extends outward from opposite sides of the perimeter edge of the display assembly.

* * * * *